INVENTOR.
Donald C. Abbott
BY
Jennings, Carter & Thompson
Attorneys

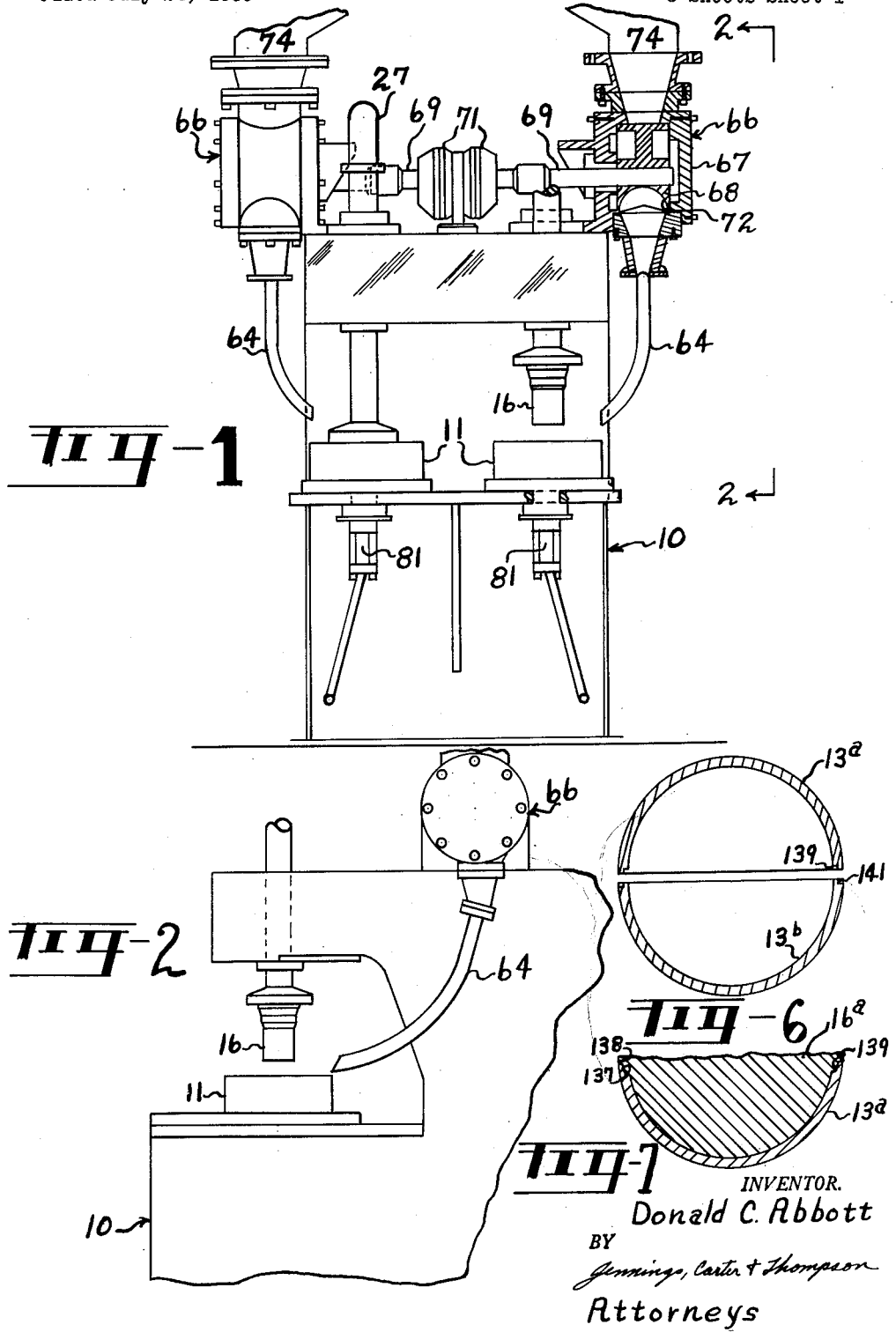

INVENTOR.
Donald C. Abbott
BY
Jennings, Carter & Thompson
Attorneys

United States Patent Office 3,072,979
Patented Jan. 15, 1963

3,072,979
PROCESS AND APPARATUS FOR MAKING SHELL CORE AND MOLD PRODUCTS
Donald C. Abbott, Rte. 1, Box 299, Leeds, Ala.
Filed July 24, 1959, Ser. No. 829,349
8 Claims. (Cl. 22—10)

This invention relates to a process and apparatus for making shell cores and molds and more particularly to such a process and apparatus in which the material from which the cores and molds are made is introduced into a core box under extreme pressure while at the same time imparting relative rotary motion between the core box and a mandrel which is adapted for movement into the core box.

An object of my invention is to provide a process and apparatus for making cores and molds in which the resulting product is cured while in the core box and under extreme pressure whereby accurate dimensions are assured at all times.

Another object of my invention is to provide a process and apparatus of the character designated which shall be adapted for producing cores and molds of relatively light weight and which shall require a minimum of materials for forming the same.

Another object of my invention is to provide a process and apparatus for making cores and molds in which the refractory material from which the molds and cores are made is introduced into the core box without the necessity of providing an air blast, thereby preventing the core box from being worn out by the core and mold forming material as it is introduced into the core box.

A further object of my invention is to provide a process and apparatus of the character designated in which there is no necessity for a curing oven, thereby not only eliminating the oven itself but eliminating the extra step of transferring the product to the oven to be cured.

A further object of my invention is to provide a process and apparatus of the character designated in which the resulting product requires a minimum of machining after the article is cured.

A further object of my invention is to provide a process and apparatus for forming cores and molds in which the product is cured uniformly throughout, thereby making it feasible to produce cores having relatively thin and thick sections.

A more specific object of my invention is to provide a process and apparatus of the character designated in which the cores and molds are formed of a refractory material having a thermosetting resin incorporated therein whereby the product is caused to flow while extreme pressures are applied and the resin is in a plastic state, thereby assuring that there is a uniform interlocking of the particles of refractory material by the thermosetting resin.

Heretofore in the art to which my invention relates, various processes have been devised for making shell cores and molds. However, such cores and molds have required excessive machining after the products are cured due to the fact that the surfaces are rough and inaccurate in size. Also, such cores and molds have required complicated apparatus and processes for forming the products.

To overcome these and other difficulties, I provide a process for forming shell cores and molds in which the material from which the cores and molds are formed is introduced into the core box while relative rotary motion is imparted between the core box and a mandrel which is adapted to move within the core box. The material is heated while under pressure and within the core box, whereby the product is cured without the necessity of providing an oven for curing the product therein. After the product is cured, relatively rotary motion is again imparted between the mandrel and the core box and the mandrel is separated from the core box. The finished product is then removed from the core box.

Apparatus embodying features of my invention is illustrated in the accompanying drawings, forming a part of this application, in which:

FIG. 1 is a side elevational view, partly broken away and in section;

FIG. 2 is a fragmental end elevational view taken generally along the line 2—2 of FIG. 1;

FIG. 6 is a sectional view showing one of the various forms of core members which may be made in accordance with my invention; and, FIG. 7 is a sectional view showing the type of mandrel employed to form the core members shown in FIG. 6.

Figure 4:
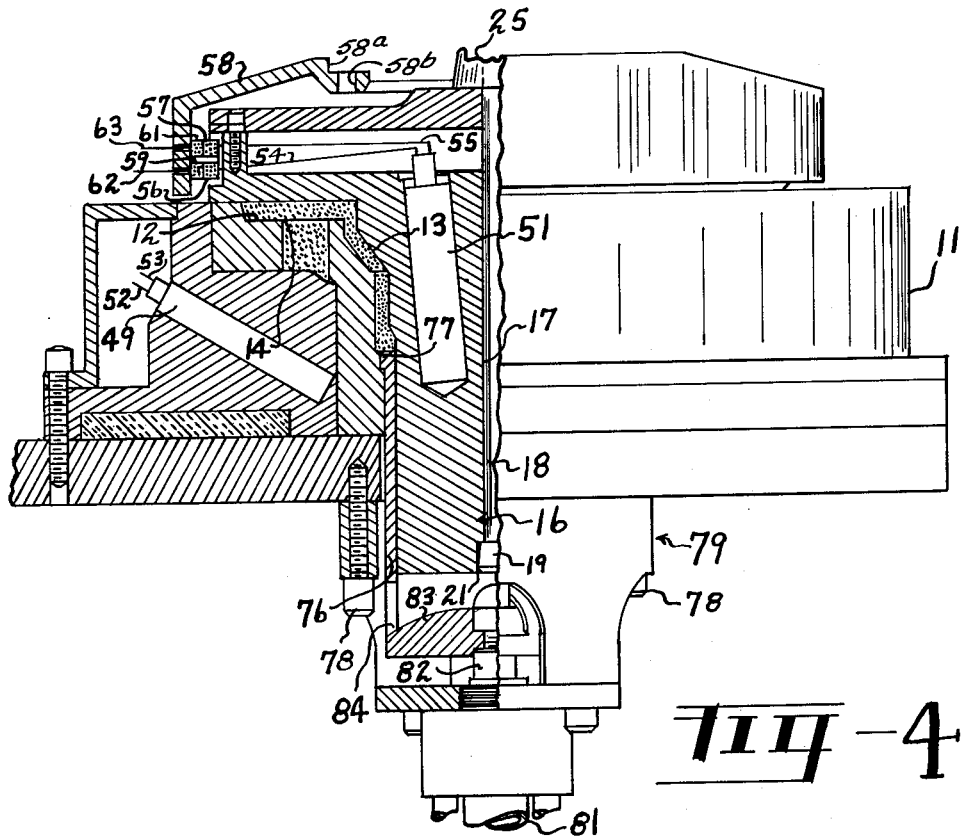
FIG. 4 is an enlarged fragmental view, partly broken away and in section, showing the mandrel positioned within the core box.
Figure 5:
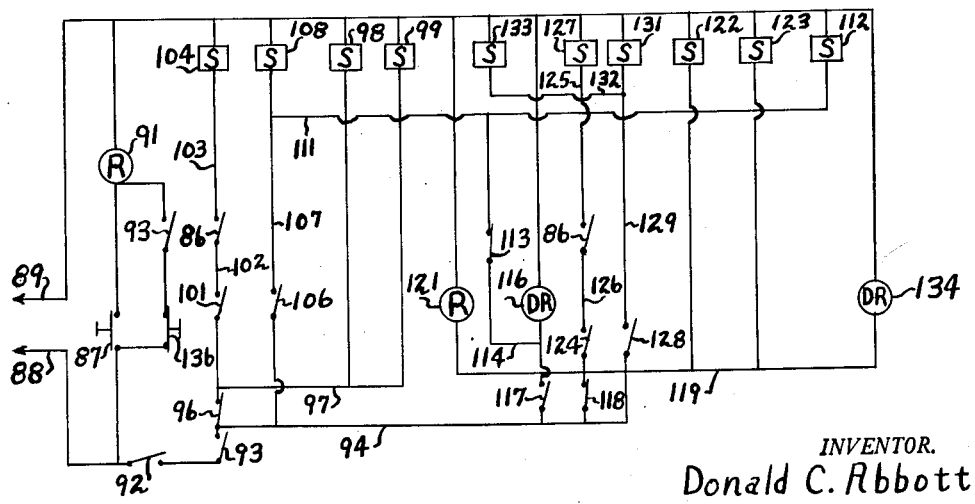
FIG. 5 is a schematic wiring diagram of the electrical circuit for my improved apparatus.

Referring now to the drawings for a better understanding of my invention, I show a supporting frame 10 which supports core boxes 11. As shown in FIG. 4, each core box 11 has an internal cavity 12 therein which corresponds to the external contour of the core 13 to be formed. The core box 11 may have suitable recesses 14 therein for forming projections on the core 13 whereby the core may be employed to form openings in the member to be formed from the core. While I have described the box 11 as being a core box, it will be apparent that the box 11 could be employed to form various types of molds, such as wheels, pulleys, cast disc plows and the like. In view of the fact that various forms of core and mold boxes may be employed, no further detail description thereof is deemed necessary.

Mounted for reciprocatory motion relative to the core box 11 is a mandrel 16 which is adapted for movement into and out of the core box as well as being adapted for rotation. As shown in FIG. 4, the external contour of the mandrel 16 corresponds to the internal contour of the core 13 to be formed.

Figure 3:
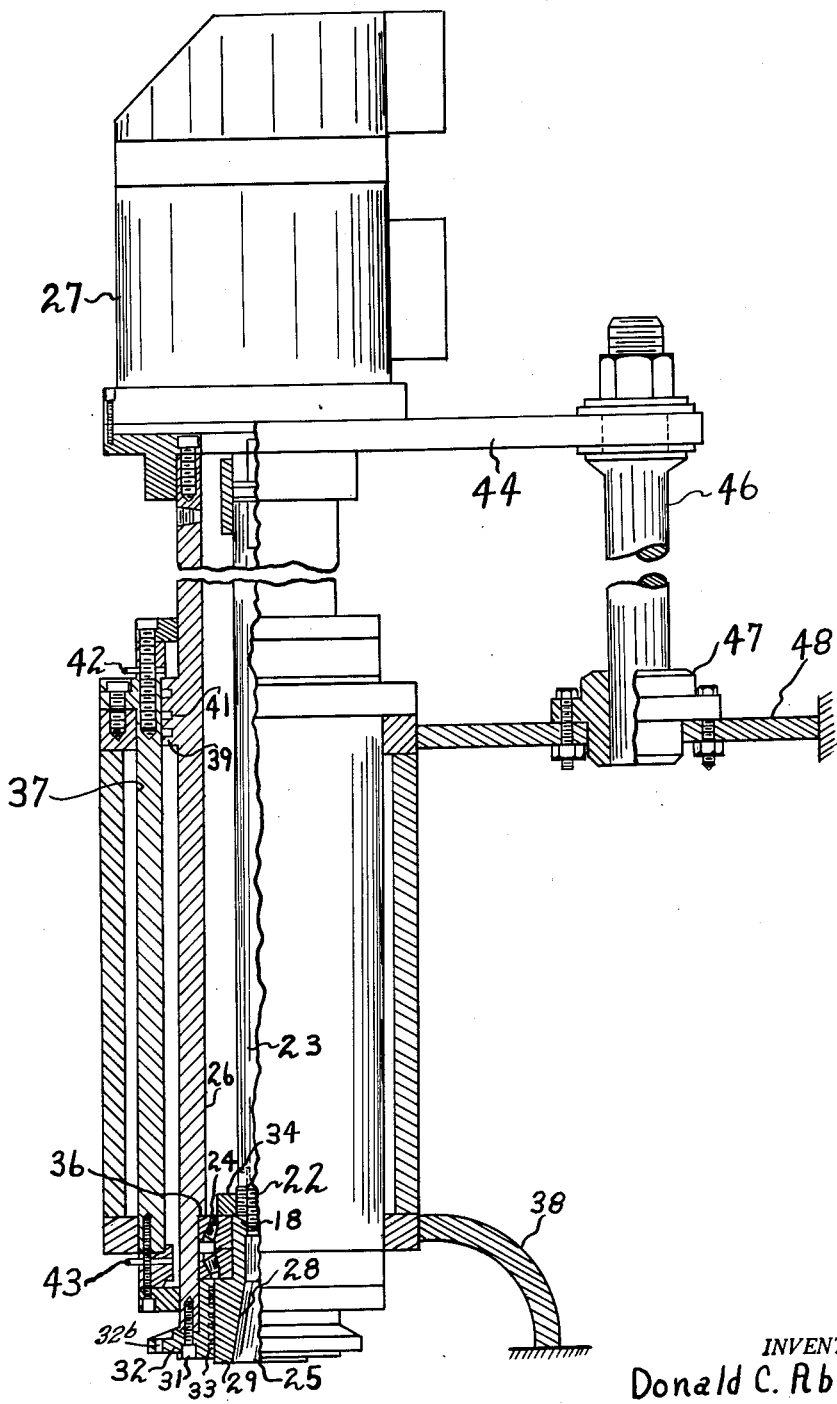
FIG. 3 is an enlarged view, partly broken away and in section, showing the means for reciprocating and rotating the mandrel.

The mandrel 16 is provided with an axially extending opening 17 therethrough for receiving a retaining member 18. One end of the retaining member 18 is provided with an enlarged diameter portion 19 which is adapted to engage a shoulder 21 defined by an enlarged diameter bore in the lower end of the mandrel, as shown in FIG. 4. The other end of the retaining member 18 is threaded externally as at 22 and threadedly engages the lower end of a rotatable shaft 23 which is adapted for rotation in suitable bearings 24 positioned between the shaft 23 and a cylindrical member 26, as shown in FIG. 3. The other end of the rotatable shaft 23 is operatively connected to a fluid pressure operated motor 27 whereby rotary motion may be imparted to the mandrel 16 through the rotatable shaft 23 and the retaining member 18. Surrounding the retaining member 18 adjacent the upper threaded end thereof is a tapered mandrel spindle 25 which engages a tapered seat 28 provided in a bearing retaining or locking member indicated generally at 29.

Secured to the lower end of the cylindrical member 26 by suitable screws 31 is a lower bearing lock member 32. Suitable sealing members 33 are interposed between the bearing lock members 29 and 32, as shown in FIG. 3. Threadedly connected to the lower end of the rotatable shaft 23 is a bearing retainer nut 34. The upper outside race of the bearing 24 is held against axial movement by engaging a shoulder 36 defined by providing an enlarged diameter bore in the lower portion of the cylindrical member 26.

The cylindrical member 26 is adapted for axial movement within an outer cylinder 37 which is connected to the supporting frame 10 by a suitable support bracket 38. Formed integrally with the outer surface of the cylindrical member 26 are piston rings 39 which carry suitable sealing rings 41 whereby a substantially fluid tight sliding fit is provided between the piston rings 39 and the cylindrical member 37. The piston rings 39 are moved axially within the outer cylinder 37 by introducing fluid under pressure through conduits 42 and 43. That is, to lower the cylindrical member 26, together with the entire mandrel unit and the hydraulic motor 27, fluid under pressure is introduced through the conduit 42 and is exhausted through conduit 43. On the other hand to raise the cylindrical member 26, fluid under pressure is introduced through the conduit 43 and is exhausted through conduit 42.

To hold the hydraulic motor and the cylindrical member 26 against rotation, a torque arm 44 connects the hydraulic motor and the cylindrical member 26 to a vertical shaft 46. The lower end of the shaft 46 slides within a suitable bearing member 47 which is carried by a supporting bracket 48 mounted on the frame 10.

As clearly shown in FIG. 4, suitable heating elements 49 are provided in the core box 11 and suitable heating elements 51 are provided in the mandrel 16. Preferably, the heating elements 49 and 51 are arranged in angularly spaced relation to each other whereby annular rows of heating elements are provided in both the core box and the mandrel. Current is supplied to the heating elements 49 by suitable leads 52 and 53. Electrical current is supplied to the heating elements 51 by leads 54 and 55 which are connected to brush elements 56 and 57, mounted on a non-rotatable hood member 58 carried by the lower bearing lock member 32 are brush members 59 and 61 which in turn are connected to electrical leads 62 and 63, respectively. The bearing lock member 32 fits within a recess 58a provided in the hood member 58 and is provided with openings 32b which register with openings 58b provided in the hood member 58 for receiving suitable retaining elements, not shown, whereby the hood member 58 is secured rigidly to and supported by the bearing lock member 32. Accordingly, electrical current is continuously circulated to the heating elements 51 as the mandrel 16 rotates relative to the non-rotating hood 58.

The material for forming the mold or core elements 13 is preferably in the form of a refractory material, such as sand, and a thermosetting resin, whereby upon applying heat to the resin-sand mixture, the cores are cured. The refractory material is introduced into the core box 11 through conduits 64 which communicate with a rotary feeder 66. Each rotary feeder 66 comprises a housing 67 which carries a rotary member 68. Each rotary member 68 is keyed to a shaft 69 which in turn is driven by a suitable hydraulic motor 71. Angularly spaced pockets 72 are provided in the rotatable member 68 whereby a measured amount of the refractory material is introduced into the core box each time the rotary member 68 is rotated to position a pocket 72 in discharge position. In view of the fact that the rotary members 68 sling the refractory material into the conduits 64, the conduits 64 communicate with the metering pockets 72 at a tangent whereby a minimum of friction is encountered by the refractory material as it is discharged into the conduit 64. Accordingly, the refractory material is transferred from the pockets 72 to the core box 11 by the action of gravity plus the centrifugal force imparted by the rotatable member 68. Suitable supply hoppers 74 are mounted above the rotary feeders 66, as shown in FIG. 1.

Telescoping within the lower portion of the cavity 12 defined in the core box 11 is a cylindrical member 76 which has an enlarged diameter portion 77 adjacent the upper end thereof that is disposed to engage an annular shoulder defined in the core box 11, as shown in FIG. 4. Accordingly, the cylindrical member 76 is adapted for axial movement after the mandrel 16 has been removed, whereby the core element 13 may be pushed out of the core box. Mounted beneath the core box 11 by suitable screws 78 is a housing 79 which in turn supports a fluid pressure operated cylinder 81. The piston rod 82 of the cylinder 81 is connected to a transverse member 83 carried by the lower end of the cylindrical member 76, whereby the cylindrical member 76 is reciprocated as the piston rod 82 is actuated by the fluid pressure operated cylinder 81. As shown in FIG. 4, and opening 84 is provided in the lower portion of the cylindrical member 76 immediately above the transverse member 83 for discharging any of the refractory material which might have fallen through the cavity 12 into the cylinder 76.

While I have described the mandrel 16 as rotating within the core box 11, it will be apparent that the core box 11 could be rotated about the mandrel 16, whereby relative rotary motion is imparted between the core box and the mandrel.

From the foregoing description, the operation of the electrical circuit for my improved apparatus will be readily understood. It should be noted that where more than one core box 11 and mandrel 16 is employed, one mandrel is in operative position within the core box while the other mandrel is removed therefrom whereby the core is ejected. That is, the core element is being formed in one core box while the core element is being ejected from the adjacent core box.

At the beginning of the cycle, electrical switches 86, which control the temperature of the heating elements to a temperature ranging from approximately 200° F. to 600° F. are closed. After the desired temperature is reached, push button 87 is closed whereby current passes from the supply lines 88 and 89 to the coil of relay 91, thereby closing two sets of normally open relay contacts 92 and 93, passing current from line 88 through contacts 92, a delay relay switch 93 to a line 94 through a delay relay switch 96 to line 97, thereby energizing a solenoid 98. Upon energizing solenoid 98, fluid is introduced by a fluid actuated valve, in a manner well understood in the art, through conduit 42 into the upper portion of cylinder 37 whereby the cylinder 26 and the mandrel at the left side of the apparatus shown in FIG. 1 is advanced toward the core box 11. At the same time, circuit is completed to a solenoid 99 whereby the cylinder 26 at the right side of the frame as shown in FIG. 1 is retracted. That is, solenoid 99 controls the supply of fluid to cylinder 37.

As the cylinder 26 at the left side of the apparatus advances a predetermined distance, switch 101 is closed, passing current through line 102, switch 86 to line 103 energizing a solenoid 104 which actuates the motor 71 to discharge sand into the conduit 64 whereby it is transferred to the core box 11.

As the cylinder 26 continues to advance toward the core box 11 and reaches a further predetermined point switch 106 is closed, passing current from line 94 to line 107 which is in communication with a solenoid 108 which is disposed to actuate motor 27 at the left side of the apparatus, as viewed in FIG. 1. Also, as the hydraulic motor 27 at the left side of the apparatus is energized, current passes through line 111 to a solenoid 112 which actuates the ejector cylinder 81 at the right side of the apparatus, as viewed in FIG. 1. Also, current passes through normally closed relay contacts 113 from line 111 to line 114 energizing delay relay coil 116, thereby closing delay relay contacts 117, passing current from line 94 to line 114 which is employed as a holding circuit for delay relay 116, thereby energizing a suitable timing element which determines the length of time that the core 13 is heated within the core box. At the end of the timing cycle or baking period, delay relay switch 118, which is normally closed opens and thereby interrupts the above described circuit with the exception of the relay 91 circuit, delay relay switch 93 circuit through line 94 and delay relay switch 96 circuit to line 114.

The second half of the cycle of operation of my improved apparatus commences with the closing of delay relay switch 118 which passes current from line 94 to line 119, energizing relay coil 121, opening relay contact 113, thereby preventing a feed-back to the above described circuit. Also, current passes through line 119 energizing solenoid 122 which actuates a suitable valve whereby fluid is introduced into the conduit 42 to advance the cylinder 26 at the right side of apparatus, as viewed in FIG. 1, toward the core box 11 therebeneath. At the same time solenoid 122 is actuated, solenoid 123 is actuated which in turn actuates a suitable valve to introduce fluid into the conduit 43 at the left side of the apparatus, as viewed in FIG. 1, whereby that cylinder is retracted.

At a predetermined distance of travel of the cylinder 26 at the right side of the apparatus, as viewed in FIG. 1, switch 124 is closed, passing current from line 119 to line 126, through a second temperature control switch 86 to line 125, thereby energizing a solenoid 127 which energizes the motor 71 at the right side of the apparatus, as viewed in FIG. 1, whereby the refractory material is discharged through the conduit 64 into the core box 11. Upon continued downward movement of the cylinder 26 at the right side of the apparatus, as viewed in FIG. 1, a switch 128 is closed which passes current from line 94 to line 129, thereby energizing a solenoid 131 which in turn actuates the hydraulic motor 27 at the right side of the apparatus, as viewed in FIG. 1. Also, at the same time current is transferred through a line 132 to a solenoid 133 which actuates the core ejector cylinder 81 at the left side of the apparatus, as viewed in FIG. 1.

Line 119 communicates with a delay relay coil 134 which starts the timing element to determine the length of time that the core 13 is baked within the core box. At the end of the timing, or baking period, delay relay switch 118 opens momentarily thereby dropping out all of the above described circuits except the relay 91 circuit. The dropping out of delay relay 116 automatically restarts the cycle.

An emergency stop push button 136 is provided to stop the apparatus at any desired time during the cycle of operation.

From the foregoing, it will be seen that at the beginning of the cycle the mandrel 16 is lowered by the cylinder 26 until it reaches a given point. As the lower end of the mandrel enters the core box 11, the refractory mixture is introduced through the conduit 64 and rotary motion is imparted to the mandrel whereby the refractory material flows outwardly and around the mandrel to fill the core box. The rotating mandrel continues to move downward until it comes into closed position, whereupon the timing element is energized and rotary motion of the mandrel is stopped. At the end of the timing cycle, the mandrel is again rotated and retracted. The core element 13 is then removed from the core box by upward movement of the ejector member 76. After removal of the core element 13 from the core box, the operator sprays the core box and mandrel with a suitable release, such as silicone, in a manner well understood in the art. It will be understood that while one core element 13 is being removed from one side of the apparatus, the core element 13 at the other side of the apparatus is being formed.

In FIGS. 6 and 7 of the drawings, I show a slightly modified form of mandrel 16a which is provided with a semi-spherical lower portion, as shown in FIG. 7 whereby the mandrel is adapted for forming a core element 13a. It will be understood that the core box would have a semi-spherical inner surface therein corresponding to the outer surface of the core element 13a. Enlarged diameter portions 137 and 138 are provided on the mandrel 16a whereby an annular recess 139 is provided in the core element in position to engage an extension 141 provided on another core element 13b. It will be understood that the core element 13b is formed by providing a recess in the mandrel instead of providing an enlarged diameter portion therein. By providing interlocking elements on the core elements 13a, the core elements can be snapped together whereby a spherical core element is provided. That is, the side walls of the core elements 13a and 13b permit sufficient flexing to permit the elements to be snapped into engagement with each other.

From the foregoing, it will be seen that I have devised an improved process and apparatus for making cores and molds. By providing a rotatable mandrel which is adapted to rotate within the core box as the refractory material is introduced, the refractory material is evenly distributed outwardly around the rotating mandrel, thereby assuring that all voids in the core box are filled. Also, by making the core element while under extreme pressure and within the core box, the refractory material forms a uniform core or mold. By rotating the mandrel as it leaves the core box and separates from the cured core element, the core element is provided with a polished surface which requires no additional finishing before use. Furthermore, by introducing the refractory, thermosetting material into the core box without the use of an air blast, the life of the apparatus is increased greatly.

While I have shown my invention in several forms, it will be obvious to those skilled in the art that it is not so limited but is susceptible of various other changes and modifications without departing from the spirit thereof, and I desire therefore, that only such limitations be placed thereupon as are specifically set forth in the appended claims.

What I claim is:

1. In apparatus for making shell core and mold products, a core box having an outwardly flaring mold cavity therein, a mandrel adapted to enter said core box and having an outwardly flaring surface in spaced relation to said outwardly flaring mold cavity, means to move said mandrel and core box relative to each other whereby said mandrel is moved into said core box and toward said mold cavity, means imparting relative rotary motion between said core box and said mandrel as said mandrel enters said core box, means to introduce a refractory material into the core box between said mandrel and said mold cavity as the mandrel enters the core box whereby said relative rotary motion between the mandrel and the core box throws the material outwardly around the mandrel as said material is introduced to fill the core box, means to impart relative inward movement of said mandrel toward said mold cavity to compress said material therebetween, means heating said refractory material while it is within said core box and under pressure to cure the refractory material, means moving said mandrel and core box relative to each other after the refractory material is compressed and heated and means concomitantly imparting relative rotary motion between the mandrel and the core box as the mandrel is removed from said core box and away from said mold cavity, and means removing the product thus formed from the core box.

2. In apparatus for making shell core and mold products as defined in claim 1 in which heating elements are provided in the mandrel and core box for heating the refractory material.

3. In apparatus for making shell core and mold products, a core box having an outwardly flaring mold cavity therein, a mandrel having an outwardly flaring surface in spaced relation to said outwardly flaring mold cavity adapted to enter said core box and move toward said mold cavity, means to move said mandrel into said core box, means to rotate said mandrel as it enters said core box, means to introduce a refractory material into the core box between said mandrel and said mold cavity as the rotating mandrel enters the core box whereby the refractory material is thrown outwardly around the mandrel as said material is introduced to fill the core box, means to impart relative inward movement of said mandrel toward said mold cavity to compress said material between said mandrel and said mold cavity, means to heat said refractory material while it is within said core box and under pressure to cure the refractory material, means removing said mandrel from said core box after the refractory material is compressed and heated and means rotating said mandrel concomitantly with removal of the mandrel from said core box, and ejector means for removing the product thus formed from the core box.

4. A process for making shell core and mold products in a core box having an outwardly flaring mold cavity therein and a mandrel having an outwardly flaring surface in spaced relation to said outwardly flaring mold cavity adapted for relative movement toward and away from said cavity together with means imparting relative rotary motion between said core box and said mandrel, which comprises imparting relative movement between said mandrel and said core box to move the mandrel within said core box and toward said mold cavity, imparting relative rotary motion between the core box and the mandrel, introducing a refractory material into the core box between said mandrel and said mold cavity as the mandrel enters the core box and moves toward said mold cavity, continuing to impart relative movement between the mandrel and the core box to move the mandrel toward the mold cavity and concomitantly imparting relative rotary motion between the core box and the mandrel to cause the refractory material to be thrown outwardly and distributed evenly around the mandrel as said material is introduced to fill the core box, continuing to impart relative movement between said mandrel and said mold cavity until a predetermined pressure is applied to the refractory material to compress said material, curing said refractory material while under pressure, imparting relative movement between the mandrel and the core box to remove the mandrel from the core box while imparting relative rotary motion between the core box and the mandrel, and then removing the product thus formed from the core box.

5. A process for making shell core and mold products as defined in claim 4 in which the core box and mandrel are both heated as the products are formed.

6. A process for making shell core and mold products as defined in claim 4 in which the refractory material introduced into the core box comprises a predetermined amount of thermosetting material.

7. A process for making shell core and mold members in a core box having an outwardly flaring mold cavity therein and a mandrel having an outwardly flaring surface in spaced relation to said outwardly flaring mold cavity adapted for relative movement toward and away from said core box, the steps which comprise imparting relative movement between said mandrel and said core box to move said mandrel within said core box and toward said mold cavity, imparting relative rotary motion between said mandrel and said core box as said mandrel is moved toward the mold cavity, introducing a refractory thermosetting material into the core box as the mandrel enters the core box and moves toward the mold cavity, continuing to impart relative rotary motion between said mandrel and said mold cavity to cause the refractory thermosetting material to be thrown outwardly and distributed evenly around the mandrel as said material is introduced to fill the core box, continuing to impart relative movement between said mandrel and said core box until a predetermined pressure is applied to the refractory material to compress said material, heating said material while under pressure, again imparting relative movement and relative rotary motion between the mandrel and the core box to remove the mandrel from the core box while relative rotary motion is imparted between said mandrel and said core box, and then removing the member thus formed from the core box.

8. A process for making shell core and mold members in a core box having an outwardly flaring mold cavity and a mandrel having an outwardly flaring surface in spaced relation to the outwardly flaring surface of said mold cavity adapted for relative movement toward and away from said mold cavity, which comprises imparting relative movement between said mandrel and said core box to move said mandrel within said core box and toward said mold cavity, imparting relative rotary motion between said mandrel and said core box as said mandrel is moved toward the mold cavity, introducing a refractory thermosetting material into the core box as the mandrel enters the core box and moves toward the mold cavity, continuing to impart relative rotary motion between said mandrel and said core box as the mandrel moves relative to the core box toward said mold cavity to cause the refractory thermosetting material to be thrown outwardly and distributed evenly around the mandrel as the material is introduced to fill the core box, continuing to impart relative movement between said mandrel and said core box until a predetermined pressure is applied to the refractory material to compress said material, heating said thermosetting material while under pressure, stopping relative rotation between the mandrel and the core box for a predetermined time to cure the refractory thermosetting material, again imparting relative rotation between said mandrel and said core box and imparting relative movement between said mandrel and said core box to remove the mandrel from the core box while imparting relative rotation between the mandrel and the core box, and then removing the member thus formed from the core box.

References Cited in the file of this patent

UNITED STATES PATENTS

| | | |
|---|---|---|
| 426,084 | Vaughn | Apr. 22, 1890 |
| 601,512 | Gunn | Mar. 29, 1898 |
| 2,641,818 | Eschenbrenner | June 16, 1953 |
| 2,800,700 | Clement | July 30, 1957 |
| 2,820,998 | Marrison | Jan. 28, 1958 |
| 2,873,493 | Thomson et al. | Feb. 17, 1959 |

FOREIGN PATENTS

| | | |
|---|---|---|
| 519,356 | Germany | Mar. 5, 1931 |